United States Patent
Kroupa et al.

(10) Patent No.: US 11,840,242 B2
(45) Date of Patent: Dec. 12, 2023

(54) METHOD AND DEVICE FOR ASCERTAINING A DYNAMIC TIRE CIRCUMFERENCE OF A MEANS OF TRANSPORTATION

(71) Applicant: Robert Bosch GmbH, Stuttgart (DE)

(72) Inventors: Stepan Kroupa, Gärtringen (DE); Ussama Lazouane, Pforzheim (DE); Fabian Stein, Sindelfingen (DE); Harald Michi, Oelbronn-Duerrn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 121 days.

(21) Appl. No.: 17/277,655

(22) PCT Filed: Nov. 27, 2019

(86) PCT No.: PCT/EP2019/082692
§ 371 (c)(1),
(2) Date: Mar. 18, 2021

(87) PCT Pub. No.: WO2020/126362
PCT Pub. Date: Jun. 25, 2020

(65) Prior Publication Data
US 2022/0024463 A1    Jan. 27, 2022

(30) Foreign Application Priority Data
Dec. 18, 2018  (DE) .......... 102018222152.9

(51) Int. Cl.
*B60W 40/12* (2012.01)
*B62D 15/02* (2006.01)
*G06F 17/18* (2006.01)

(52) U.S. Cl.
CPC .......... *B60W 40/12* (2013.01); *B62D 15/027* (2013.01); *G06F 17/18* (2013.01)

(58) Field of Classification Search
CPC . B60W 40/12; B62D 15/027; B62D 15/0285; G06F 17/18; B60T 2240/07
See application file for complete search history.

(56) References Cited

U.S. PATENT DOCUMENTS 7,870,781 B2 * 1/2011 Polzin ..................... B60C 23/06
                                                        73/146
8,447,457 B2 * 5/2013 Polzin ................... B60C 23/062
                                                        701/29.1

(Continued)

FOREIGN PATENT DOCUMENTS

DE   102006058567 A1   6/2008
DE   102010000867 A1   7/2011

(Continued)

OTHER PUBLICATIONS

International Search Report for PCT/EP2019/082692, dated May 4, 2020.

*Primary Examiner* — Sze-Hon Kong
(74) *Attorney, Agent, or Firm* — NORTON ROSE FULBRIGHT US LLP; Gerard Messina

(57) ABSTRACT

A method and a device for ascertaining a dynamic tire circumference of a transportation vehicle. The method includes: receiving a first signal representing a yaw rate of the transportation vehicle, a second signal representing a wheel rotation speed of a wheel of the transportation vehicle, a third signal representing a steering angle of the transportation vehicle, and a fourth signal representing a dynamic track width of the transportation vehicle; ascertaining a first output signal of a first Kalman filter that represents the dynamic tire circumference of the wheel, using the first signal, the second signal, the third signal, and the fourth signal as input signals for the first Kalman filter; and using the first output signal in a control unit of the transportation vehicle.

19 Claims, 2 Drawing Sheets

(56) References Cited

U.S. PATENT DOCUMENTS

| | | | | |
|---|---|---|---|---|
| 2003/0172728 A1* | 9/2003 | Gustafsson | ............ | B60C 23/061 73/146 |
| 2005/0030170 A1* | 2/2005 | Rieck | ................... | B60C 23/061 340/443 |
| 2009/0125181 A1* | 5/2009 | Luke | .................... | B60C 23/062 180/204 |
| 2009/0326733 A1* | 12/2009 | Abele | ..................... | G01P 21/02 701/1 |
| 2010/0114354 A1* | 5/2010 | Lee | ........................ | G05B 17/02 700/173 |
| 2011/0066322 A1* | 3/2011 | Karlsson | ............. | G01G 19/086 701/33.4 |
| 2011/0257882 A1* | 10/2011 | McBurney | ............ | G01C 21/30 701/532 |
| 2014/0190753 A1* | 7/2014 | Mian | .................... | G01G 23/002 177/136 |
| 2015/0224986 A1* | 8/2015 | Heinrichs-Bartscher | .................... | B60W 30/08 701/101 |
| 2016/0257303 A1* | 9/2016 | Lavoie | ................. | B60W 30/06 |
| 2018/0004222 A1* | 1/2018 | Maruoka | ........... | B62D 15/0275 |
| 2019/0001757 A1* | 1/2019 | Singh | .................. | B60C 23/0415 |
| 2020/0018596 A1* | 1/2020 | Hinz | ..................... | G01C 22/02 |
| 2020/0156650 A1* | 5/2020 | Kretschmann | ........ | G01G 19/12 |
| 2020/0231010 A1* | 7/2020 | Carpenter | ............ | B60C 11/246 |
| 2021/0261143 A1* | 8/2021 | Lapis | ..................... | B60T 8/172 |

FOREIGN PATENT DOCUMENTS

| | | | | |
|---|---|---|---|---|
| DE | 102010007650 A1 | | 8/2011 | |
| DE | 102012216215 A1 | | 3/2013 | |
| DE | 102012000213 A1 | | 7/2013 | |
| DE | 102012208298 A1 | | 11/2013 | |
| DE | 102013021826 A1 | | 6/2015 | |
| DE | 102016103637 A1 | | 9/2016 | |
| DE | 102016010750 A1 | | 3/2018 | |
| DE | 102016223902 A1 | | 6/2018 | |
| DE | 102017219918 A1 | * | 5/2019 | ............ B60W 40/12 |
| DE | 102019125655 A1 | * | 3/2021 | ............ B60C 23/061 |
| WO | 03022651 A1 | | 3/2003 | |

* cited by examiner

METHOD AND DEVICE FOR ASCERTAINING A DYNAMIC TIRE CIRCUMFERENCE OF A MEANS OF TRANSPORTATION

FIELD

The present invention relates to a method and a device for ascertaining a dynamic tire circumference of a means of transportation, and in particular ascertaining the dynamic tire circumference based on a Kalman filter.

Conventional means of transportation may include assistance systems for automatically and/or semi-automatically carrying out driving maneuvers. Such assistance systems may be parking assistance systems, for example, which, based on surroundings sensors and suitable surroundings detection algorithms, are configured to automatically and/or semi-automatically maneuver a means of transportation into a parking space. For computing a suitable parking trajectory for the means of transportation, in addition to information concerning a vehicle geometry, information concerning a tire circumference of particular wheels of the means of transportation and a track width of the means of transportation, among other things, are required. Using predefined values of a particular tire circumference and a particular track width of a means of transportation may possibly be too inaccurate, due to dynamic influences on these two variables, to allow parking operations based on these variables or maneuvering operations deviating from same to be carried out with a desired and/or necessary predefined accuracy. For this reason, conventional methods and devices ascertain an instantaneous, dynamic tire circumference in each case, on the basis of which subsequent driving maneuvers may be carried out with a correspondingly greater accuracy.

In addition, conventional so-called Kalman filters are capable of estimating the state of a system based on measured variables and in particular based on noisy measured variables.

German Patent Application No. DE 10 2016 103 637 A1 describes a parking assistance system that takes into account a changing tire radius and a track width. A tire radius estimate is made, using a plurality of parameters such as a wheel speed, a GPS speed, a steering angle, and a yaw rate of a means of transportation.

German Patent Application No. DE 10 2013 021 826 A1 describes a method for determining a steering angle of a motor vehicle with the aid of a driving assistance device, taking into account a track width in addition to a wheel circumference.

German Patent Application No. DE 10 2012 208 298 A1 describes a method for ascertaining a tire circumference in conjunction with the use of a yaw angle, and on this basis deriving a method for controlling a parking operation.

German Patent Application No. DE 10 2010 000 867 A1 describes a method for ascertaining an updated wheel circumference, an initially assumed wheel circumference being retroactively corrected with the aid of measured acceleration data.

German Patent Application No. DE 10 2012 000 213 A1 describes a method for ascertaining an instantaneous wheel circumference of at least one wheel of a motor vehicle, based on two vehicle positions determined by satellite navigation.

German Patent Application No. DE 10 2006 058 567 A1 describes a method for ascertaining an updated wheel circumference, in which various data sources, among them GPS data, are used.

German Patent Application No. DE 10 2010 007 650 A1 describes a method for ascertaining an instantaneous wheel circumference, based on distance values from a distance measurement, using distance sensors and a wheel pulse count.

SUMMARY

According to a first aspect of the present invention, a method for ascertaining a dynamic tire circumference of a means of transportation is provided. The means of transportation (i.e., a transportation vehicle) may be, for example, a road vehicle (a motorcycle, passenger automobile, van, truck, shuttle bus, for example) or a rail vehicle or an aircraft/airplane or a watercraft.

In a first step of the method according to an example embodiment of the present invention, a first signal representing a yaw rate of the means of transportation, a second signal representing a wheel speed of a wheel of the means of transportation, a third signal representing a steering angle of the means of transportation, and a fourth signal representing a dynamic track width of the means of transportation are received by a device according to the present invention in the means of transportation. The dynamic tire circumference and the dynamic track width are variables that are advantageously usable compared to a technical tire circumference and a technical track width, since they represent the values of the tire circumference and the track width that are actually present during a driving operation of the means of transportation. The technical tire circumference and the technical track width are understood here to mean predefined values that, for example, are measured at a standstill of the means of transportation and/or that may be taken from a technical specification of the means of transportation and/or tires used at that moment. In contrast, the dynamic tire circumference and the dynamic track width are understood to mean the values that are present during an actual driving operation of the means of transportation. These values may differ from the predefined technical values, for example due to tire slip, temperature- and/or load-related pressure fluctuations in the wheel, pressure loss in the wheel, or other influencing factors.

A device according to an example embodiment of the present invention may preferably encompass an evaluation unit that includes a data input and a data output. With the aid of the data input, the evaluation unit, for example via a vehicle electrical system of the means of transportation, may be connected via information technology to a plurality of sensors and/or control units of the means of transportation which may detect and/or provide the above-mentioned signals. In addition, the evaluation unit may be connected via information technology to an internal and/or external memory unit in which data that are received and/or computed by the evaluation unit may be stored.

The yaw rate (or also yaw angular velocity) represents the rotational speed of the means of transportation about its vertical axis (z axis), and may be detected, for example, with the aid of a rotation rate sensor of the means of transportation. The wheel speed of the wheel of the means of transportation may be detected with the aid of a wheel speed sensor, it preferably being possible for each of the wheels of the means of transportation to include such a wheel speed sensor so that particular wheel speeds of all wheels of the means of transportation may be detected and taken into account. The steering angle of the means of transportation may be detected based on a steering angle sensor, for example, which is preferably situated in or at a steering column of the means of transportation and configured to detect a particular steering angle of the steering wheel. The variables mentioned here which are transmitted to the evaluation unit with the aid of the first signal, the second signal, and the third signal may be received directly from the particular sensors for detecting these variables, and/or via control units of the means of transportation which are connected via information technology to the particular sensors.

In this regard, the dynamic track width may be a predefined value or a computed value. For the case that it is used in the form of a predefined value, this predefined value may preferably be stored in the memory unit connected to the evaluation unit, and may be read out by the evaluation unit as needed. For this purpose, the memory unit may include a persistent memory whose content is retained even after an interruption of a power supply of the memory unit. Alternatively or additionally, the memory unit may include a volatile memory which may preferably be utilized for storing data that are received and computed by the evaluation unit. The predefined value representing the dynamic track width of the means of transportation may be determined, for example, based on a measurement of the track width of the means of transportation and stored in the memory unit. For the case that the dynamic track width is used in the form of a computed value, the method according to the present invention, described in greater detail below, may be applied to compute a particular instantaneous value of the dynamic track width of the means of transportation. It is pointed out that according to the method according to the present invention, in particular a combination of a use of a predefined value of the dynamic track width and a use of a computed value of the dynamic track width may be provided. In other words, the computation of the dynamic tire circumference may initially take place using a predefined value of the dynamic track width. Based on a subsequently computed value of the dynamic tire circumference, a computation of the dynamic track width may also correspondingly take place, which beginning at this point in time may be used as an alternative to the predefined value of the dynamic track width.

In a second step of the method according to an example embodiment of the present invention, a first output signal of a first Kalman filter representing the dynamic tire circumference of the wheel is ascertained using the first signal, the second signal, the third signal, and the fourth signal as input signals for the first Kalman filter. For this purpose, the first Kalman filter may advantageously be a filter that includes a state space model for computing the dynamic tire circumference, which may be implemented, for example, in the form of a computer program that is executed by the evaluation unit. The first Kalman filter may in particular be an extended Kalman filter, referred to below as EKF filter, and may preferably be an unscented Kalman filter, referred to below as UKF filter. The latter are suitable in particular for mapping nonlinearities in the state space model to be mapped in each case by the Kalman filter, which is important in particular in conjunction with the computation of the dynamic tire circumference and of the dynamic track width. The computation of the dynamic tire circumference and the computation of the dynamic track width, respectively, preferably take place based on the following equations:

$$\dot{\psi}_z = \frac{C}{T} \cdot \frac{\omega_{RR} - \omega_{RL}}{\cos(\delta_R)}$$

-continued
and $$\dot{\psi}_z = \frac{C}{T} \cdot \frac{\omega_{FR} - \omega_{FL}}{\cos(\delta_F)}$$

$\dot{\psi}_z$ denotes the yaw rate of the means of transportation, $\omega_i$ denotes the wheel speeds of the particular wheels of the means of transportation (where index i stands for RR: right rear, LR: left rear, RF: right front, and LF: left front), $\delta_j$ denotes the steering angle of the means of transportation (where index j stands for R: rear and F: front), C denotes the dynamic tire circumference, and T denotes the dynamic track width. At this point it is noted that the method according to the present invention may also be carried out based on a single piece of wheel speed information of an individual wheel of the means of transportation (the left front wheel, for example), and that it is not mandatory to incorporate a plurality of wheel speeds of a plurality of wheels of the means of transportation into the computation. If a plurality of wheel speeds is fed into the first Kalman filter, for example the wheel speed of one wheel of the means of transportation may be fixed as a reference variable, while the respective other wheel speeds, which in each case may be based on the reference variable, are incorporated as virtual variables into the first Kalman filter.

In a third step of the method according to the present invention, the first output signal, which represents the dynamic tire circumference of the means of transportation, is used in a control unit of the means of transportation. For this purpose, the value of the dynamic tire circumference computed by the evaluation unit according to the present invention may be output to the vehicle electrical system of the means of transportation via the data output of the evaluation unit. The vehicle electrical system or a partial vehicle electrical system of the means of transportation utilized for this purpose may be implemented, for example, in the form of a CAN, MOST, FlexRay, or LIN bus or in the form of an Ethernet connection. The control unit, the same as the evaluation unit itself, may likewise be connected via information technology to the vehicle electrical system or the utilized partial vehicle electrical system of the means of transportation, and may thus receive signals, representing the dynamic tire circumference, that are transmitted by the evaluation unit. The control unit may, for example, be a driver assistance system such as a parking assistance system which, based on values of the dynamic tire circumference instantaneously computed in each case, may be configured to carry out desired parking maneuvers with a correspondingly high level of accuracy. In addition, even further driver assistance systems and/or maneuvering systems of the means of transportation may be receivers of values of the dynamic tire circumference instantaneously computed in each case. Alternatively or additionally, particular values of the dynamic tire circumference may also be received by a system for fully automatic vehicle control of the means of transportation and used in same for the vehicle control.

Preferred refinements and embodiments of the present invention are disclosed herein.

As described above, the dynamic track width may be used based on a predefined estimated value or based on a computed value. For the case that a computed value is applied, the dynamic track width may preferably be computed with the aid of a second Kalman filter whose input signals include the first signal, the second signal, the third signal, and the first output signal of the first Kalman filter. The second Kalman filter may be a filter that includes a state space model for computing the dynamic track width, in particular a UKF filter and preferably an EKF filter. If the first output signal of the first Kalman filter is not yet available at a computation point in time for the dynamic track width (possibly because it has not yet been computed), a predefined estimated value of the dynamic tire circumference may be fed into the second Kalman filter instead of the first output signal. The predefined estimated value of the dynamic tire circumference may likewise be stored in the memory unit that is connected to the evaluation unit. As soon as the dynamic tire circumference is present as a computed value in the form of the first output signal of the first Kalman filter, as a response this computed value may be used as an input signal for the second Kalman filter. For the case that neither a computed value of the dynamic tire circumference nor a computed value of the dynamic track width is initially present in the system, the particular predefined estimated values may initially be used for both values. A subsequent computation of the dynamic track width and of the dynamic tire circumference based on instantaneous output signals of the respective other Kalman filter may thus result in a successive approximation of the particular values to the actual values of an instantaneous dynamic track width that are present, and of an instantaneous dynamic tire circumference of the means of transportation.

In a further advantageous embodiment of the present invention, a fifth signal representing a piece of position information of a satellite-based locating system of the means of transportation is additionally fed as an input signal into the first Kalman filter and used in ascertaining the dynamic tire circumference. The satellite-based locating system may be, for example, a GPS, a Galileo system, or some other conventional locating system. A corresponding receiving unit for the satellite-based locating system may be situated, for example, in a navigation unit of an onboard computer of the means of transportation. Alternatively or additionally, such a receiving unit may be provided in a different control unit of the means of transportation. With the aid of a connection via information technology of the control unit, which includes the receiving unit for the satellite-based locating system, to the vehicle electrical system of the means of transportation, the instantaneous pieces of position information of the means of transportation received in the means of transportation may be transmitted to the evaluation unit according to the present invention via the vehicle electrical system. The evaluation unit may, for example, initially store the received data in a volatile memory of the memory unit, and subsequently feed the data in the form of the fifth signal into the first Kalman filter. Due to the additional utilization of the particular instantaneous pieces of position information of the means of transportation, accuracy in computing the dynamic tire circumference, and thus also the dynamic track width, may be increased. Alternatively or additionally, by utilizing the pieces of position information, a duration of an approximation of the values of the dynamic tire circumference and of the dynamic track width, computed in each case, to the actual values may be shortened. Taking into account the position information may preferably take place according to the following equation:

$$v_{GPS} = C \cdot \frac{\omega_{RR} + \omega_{RL}}{2}$$

In a further advantageous embodiment of the present invention, the first output signal of the first Kalman filter is updated or not updated as a function of predefined criteria. This may be advantageous in particular when a quality of instantaneously present input signals for the first Kalman filter is below a predefined threshold, and/or one or more of the input signals are instantaneously not present based on the situation and/or due to a technical defect. In such a case, the computer program executed by the evaluation unit may output a most recently computed, valid value of the dynamic tire circumference unchanged to the output of the first Kalman filter (i.e., regardless of instantaneously present input signals at the first Kalman filter), until appropriate predefined criteria for computing the dynamic track width have once again been satisfied. In addition to the above-mentioned predefined criteria, for example an instantaneous travel direction and/or a speed of the means of transportation, an activation state of further functions or control units in the means of transportation (for example, an active vehicle dynamics control system, etc.), a category of an instantaneously traveled route (off-road travel, for example), etc., may also result in retention of the most recently computed, valid value at the output of the first Kalman filter. In addition, a predefined minimum training period for the first Kalman filter which has not yet elapsed may also represent such a predefined criterion. The above-mentioned points may also similarly apply to the second Kalman filter and its input variables, and may be used in same analogously to the first Kalman filter.

In a further advantageous embodiment of the present invention, a second output signal representing a quality of the first output signal of the first Kalman filter is output by the first Kalman filter. This signal may be used in general for assessing an instantaneous value of the dynamic tire circumference and/or used in the form of a predefined criterion for the above-described updating or nonupdating of the first output signal. Alternatively, the second output signal, for example in the event of insufficient quality of the first output signal, may also be used to output the predefined estimated value of the dynamic tire circumference, instead of the computed value of the dynamic tire circumference, at the output of the first Kalman filter. Here as well, the measures described for the first Kalman filter may be analogously applied to the second Kalman filter.

In a further advantageous embodiment of the present invention, the ascertainment of the dynamic tire circumference and/or of the dynamic track width is carried out at a longitudinal speed of the means of transportation of 1 km/h to 200 km/h, in particular 3 km/h to 150 km/h, and preferably 5 km/h to 130 km/h. By adherence to one or more of the provided value ranges for the longitudinal speed of the means of transportation, it may be ensured that a quality or reliability of the ascertained values of the dynamic tire circumference and of the dynamic track width is sufficient for a subsequent processing of the particular values.

It is pointed out that within the scope of protection of the present invention, the above-mentioned method steps and their advantageous embodiments may be combined, modified, and omitted in different ways. In one specific implementation of the method according to the present invention, with the aid of the computer program according to the present invention, for example different modes for computing the dynamic tire circumference and/or the dynamic track width may be provided, which may be suitably selected as a function of the predefined criteria and/or a quality of the output signals of the first and/or second Kalman filter and/or signals that are available in a particular means of transportation.

According to a second aspect of the present invention, a device for ascertaining a dynamic tire circumference of a means of transportation is provided. In accordance with an example embodiment of the present invention, the device includes an evaluation unit with a data input and a data output, and may be an integral part of an existing control unit or an independent control unit of the means of transportation. In addition, the evaluation unit may be designed, for example, as an ASIC, FPGA, processor, digital signal processor, or microcontroller, among others, and connected via information technology to an internal and/or external memory unit in which data that are received and/or computed by the evaluation unit may be stored for a subsequent processing. Furthermore, the evaluation unit may be configured to carry out the above-described method steps according to the present invention based on a computer program that implements the method steps. The evaluation unit is further configured to receive, in conjunction with the data input, a first signal representing a yaw rate of the means of transportation, a second signal representing a wheel speed of a wheel of the means of transportation, a third signal representing a steering angle of the means of transportation, and a fourth signal representing a dynamic track width of the means of transportation. This may preferably take place by a connection via information technology of the data input of the evaluation unit to a vehicle electrical system of the means of transportation, via which the evaluation unit may receive the above-mentioned signals from further control units of the means of transportation. The evaluation unit is also configured to ascertain a first output signal of a first Kalman filter representing the dynamic tire circumference of the wheel, using the first signal, the second signal, the third signal, and the fourth signal as input signals for the first Kalman filter. In conjunction with the data output, the evaluation unit is additionally configured to use the first output signal in a control unit of the means of transportation. For this purpose, the data output of the evaluation unit may likewise be connected via information technology to the vehicle electrical system of the means of transportation, so that the evaluation unit is enabled to transfer first output signals, computed with the aid of the first Kalman filter, via the vehicle electrical system to one or multiple suitable receivers of the first output signal in the means of transportation.

BRIEF DESCRIPTION OF THE DRAWINGS

Exemplary embodiments of the present invention are described in greater detail below with reference to the figures.

FIG. 1 shows a flowchart that illustrates steps of one exemplary embodiment of a method according to the present invention for ascertaining a dynamic tire circumference of a means of transportation, which is a passenger automobile here. An evaluation unit according to the present invention, which is coupled via information technology to a vehicle electrical system of the means of transportation, in first step 100 receives a first signal representing a yaw rate of the means of transportation, a second signal representing a wheel speed of a wheel of the means of transportation, a third signal representing a steering angle of the means of transportation, and a fourth signal representing a dynamic track width of the means of transportation, and stores data represented by the signals in a memory unit that is connected via information technology to the evaluation unit. The evaluation unit ascertains a first output signal of a first Kalman filter representing the dynamic tire circumference of the wheel, using the first signal, the second signal, the third signal, and the fourth signal as input signals for the first Kalman filter in step 200. The first Kalman filter is a UKF filter here. The first output signal is ascertained based on a computer program that is executed by the evaluation unit and that maps a state space model for computing the dynamic tire circumference. The first output signal of the UKF filter is transferred to a parking assistance system of the means of transportation via the vehicle electrical system of the means of transportation in third step 300, and the parking assistance system carries out a fully automatic parking maneuver based on the first output signal.

FIG. 2 shows a block diagram of a first Kalman filter K1 according to the present invention for computing a dynamic tire circumference of a means of transportation. For this purpose, a first signal S1 representing a yaw rate of the means of transportation, a second signal S2 representing a wheel speed of a wheel of the means of transportation, a third signal S3 representing a steering angle of the means of transportation, and a fourth signal S4 representing a dynamic track width of the means of transportation are fed into the input of first Kalman filter K1. Fourth signal S4 representing the dynamic track width of the means of transportation corresponds here to a value of the dynamic track width that is actually computed and not estimated. Based on input signals S1, S2, S3, S4 and based on a suitable state space model, first Kalman filter K1 is configured to compute a first output signal A1 that represents the dynamic tire circumference of the means of transportation. In addition, first Kalman filter K1 generates a second output signal A2 that represents a measure for a quality of first output signal A1.

FIG. 3 shows a block diagram of a second Kalman filter K2 according to the present invention for computing a dynamic track width of a means of transportation. For this purpose, a first signal S1 representing a yaw rate of the means of transportation, a second signal S2 representing a wheel speed of a wheel of the means of transportation, a third signal S3 representing a steering angle of the means of transportation, and a first output signal A1 of first Kalman filter K1 representing a dynamic tire circumference of the means of transportation are fed into the input of second Kalman filter K2. First output signal A1 representing the dynamic tire circumference of the means of transportation corresponds here to a value of the dynamic tire circumference that is actually computed and not estimated. Second Kalman filter K2 is configured, based on input signals S1, S2, S3, A1 and based on a suitable state space model, to compute a fourth signal S4 that represents the dynamic track width of the means of transportation.

FIG. 4 shows a schematic overview of components of a device according to the present invention in conjunction with a means of transportation 80. The device according to the present invention includes an evaluation unit 10, which is a microcontroller here and which includes a data input 12 and a data output 14. In addition, an external memory unit 20 in which evaluation unit 10 may store received and/or computed data is connected via information technology to evaluation unit 10. Evaluation unit 10 is configured to carry out the above-described method steps according to the present invention, based on a computer program. A rotation rate sensor 50 of means of transportation 80 is connected via information technology to data input 12 of evaluation unit 10 via a CAN bus of a vehicle electrical system of means of transportation 80. In addition, a plurality of wheel speed sensors 60 of particular wheels 85 of means of transportation 80 is likewise connected to data input 12 of evaluation unit 10 via the CAN bus. Furthermore, a steering angle sensor 70 and a GPS receiver 40 of means of transportation 80 are likewise connected to data input 12 of evaluation unit 10 via the CAN bus. In this way, evaluation unit 10 is configured to receive a first signal representing a yaw rate of rotation rate sensor 50, second signals representing wheel speeds of a plurality of wheel speed sensors 60, a third signal representing a steering angle of steering angle sensor 70, and a fifth signal representing a piece of position information of GPS receiver 40 of means of transportation 80. In addition, evaluation unit 10 receives from memory unit 20 a predefined estimated value of a dynamic track width of means of transportation 80. All of the reception signals described above and the predefined estimated value of the dynamic track width of means of transportation 80 are supplied to a first Kalman filter in evaluation unit 10 as input signals in order to compute a dynamic tire circumference of means of transportation 80 based on these input signals. The first Kalman filter is implemented with the aid of the computer program that is executed by evaluation unit 10. A result of the computation of the dynamic tire circumference is transferred, with the aid of data output 14 of evaluation unit 10, to a parking assistance system 30 of means of transportation 80 via the CAN bus. Parking assistance system 30 subsequently uses the information concerning the dynamic tire circumference in carrying out a fully automatic parking operation of means of transportation 80.

Figure 1:
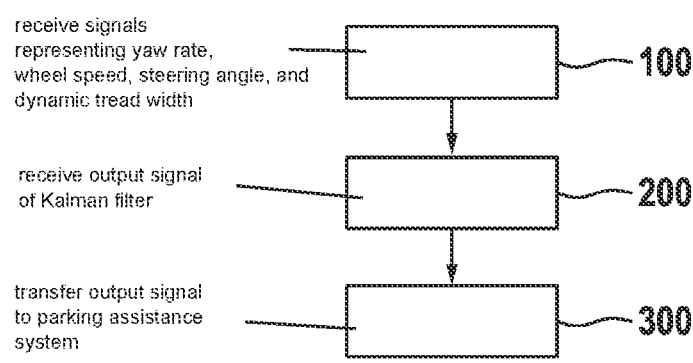
FIG. 1 shows a flowchart that illustrates steps of one exemplary embodiment of a method according to the present invention.
Figure 2:
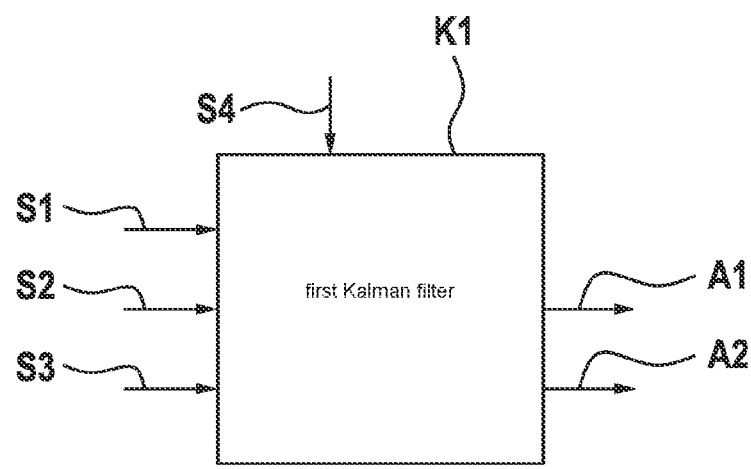
FIG. 2 shows a block diagram of a first Kalman filter according to the present invention for computing a dynamic tire circumference of a means of transportation.
Figure 3:
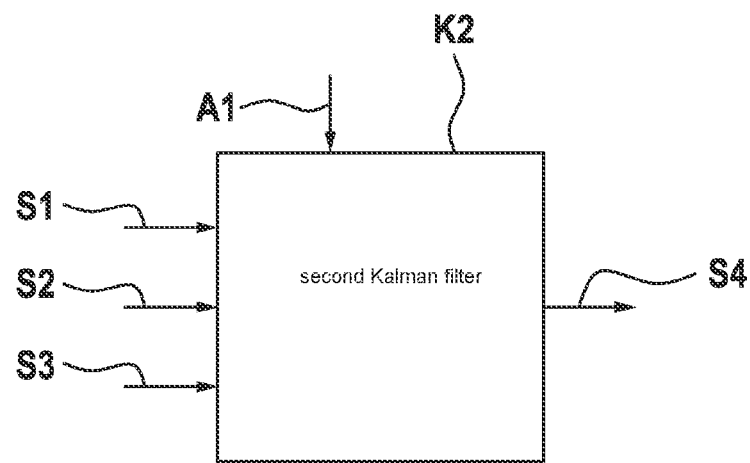
FIG. 3 shows a block diagram of a second Kalman filter according to the present invention for computing a dynamic track width of a means of transportation.
Figure 4:
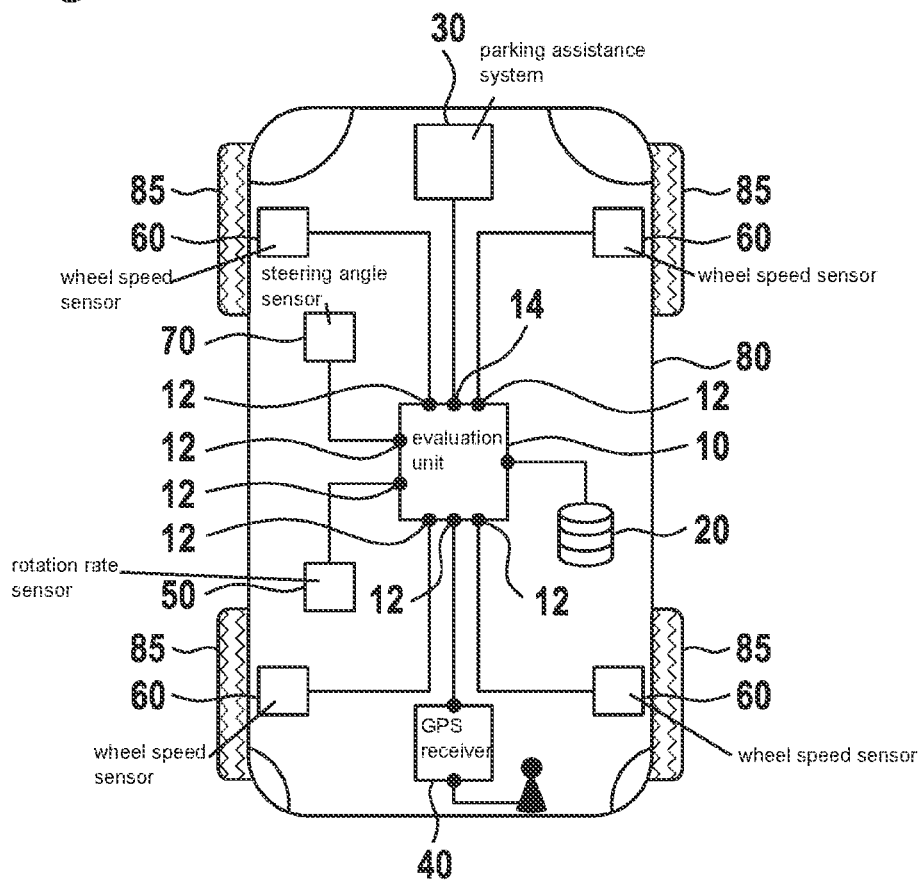
FIG. 4 shows a schematic overview of components of a device according to the present invention in conjunction with a means of transportation.

What is claimed is:

1. A method for ascertaining a dynamic tire circumference of a transportation vehicle, the method comprising the following steps:
computing a dynamic track width of the transportation vehicle using a first instance of a first output signal of a first Kalman filter;
receiving a first signal representing a yaw rate of the transportation vehicle, a second signal representing a wheel speed of a wheel of the transportation vehicle, a third signal representing a steering angle of the transportation vehicle, and a fourth signal representing the computed dynamic track width of the transportation vehicle;
ascertaining another instance of the first output signal of the first Kalman filter that represents the dynamic tire circumference of the wheel, using the first signal, the second signal, the third signal, and the fourth signal as input signals for the first Kalman filter; and
using the first output signal in a control unit of the transportation vehicle.

2. The method as recited in claim 1, wherein the first Kalman filter is a filter that includes a state space model for computing the dynamic tire circumference.

3. The method as recited in claim 2, wherein the first Kalman filter is an extended Kalman (EKF) filter or an unscented Kalman (UKF) filter.

4. The method as recited in claim 1, wherein a fifth signal representing a piece of position information of a satellite-based locating system of the transportation vehicle is additionally fed as an input signal into the first Kalman filter and used in ascertaining the dynamic tire circumference.

5. The method as recited in claim 1, wherein the first output signal of the first Kalman filter is updated or not updated as a function of predefined criteria.

6. The method as recited in claim 1, wherein a second output signal representing a quality of the first output signal of the first Kalman filter is output by the first Kalman filter.

7. The method as recited in claim 1, wherein the ascertainment of the dynamic tire circumference and/or of the dynamic track width is carried out at a longitudinal speed of the transportation vehicle of 1 km/h to 200 km/h.

8. The method as recited in claim 1, wherein the ascertainment of the dynamic tire circumference and/or of the dynamic track width is carried out at a longitudinal speed of the transportation vehicle of 3 km/h to 150 km/h.

9. The method as recited in claim 1, wherein the ascertainment of the dynamic tire circumference and/or of the dynamic track width is carried out at a longitudinal speed of the transportation vehicle of 5 km/h to 130 km/h.

10. The method as recited in claim 1, wherein the first output signal of the first Kalman filter is used in a driver assistance system of the transportation vehicle.

11. The method as recited in claim 1, wherein the first output signal of the first Kalman filter is used in a driver assistance system of the transportation vehicle in a maneuvering system of the transportation vehicle.

12. The method as recited in claim 1, wherein the first output signal of the first Kalman filter is used in a driver assistance system of the transportation vehicle in a parking assistance system of the transportation vehicle.

13. The method as recited in claim 1, wherein a plurality of second signals representing a plurality of wheel speeds of a plurality of wheels of the transportation vehicle is incorporated into the first Kalman filter.

14. A device for ascertaining a dynamic tire circumference of a transportation vehicle, comprising:
an evaluation unit;
a data input; and
a data output;
wherein the evaluation unit is configured to:
compute a dynamic track width of the transportation vehicle using a first instance of a first output signal of a first Kalman filter;
receive, in conjunction with the data input, a first signal representing a yaw rate of the transportation vehicle, a second signal representing a wheel speed of a wheel of the transportation vehicle, a third signal representing a steering angle of the transportation vehicle, and a fourth signal representing the computed dynamic track width of the transportation vehicle;
ascertain another instance of the first output signal of the first Kalman filter that represents the dynamic tire circumference of the wheel, using the first signal, the second signal, the third signal, and the fourth signal, as input signals for the first Kalman filter; and
use, in conjunction with the data output, the first output signal in a control unit of the transportation vehicle.

15. The method as recited in claim 1, wherein the computing of the dynamic track width is performed using a second Kalman filter.

16. The method as recited in claim 15, wherein the second Kalman filter uses, as input signals thereto, the first signal, the second signal, the third signal, and the first output signal of the first Kalman filter.

17. The method as recited in claim 15, wherein output of the second Kalman filter is used as input to the first Kalman filter, and the output signal output by the first Kalman filter is used as input to the second Kalman filter.

18. A method for ascertaining a dynamic track width of a transportation vehicle, the method comprising the following steps:
receiving a first signal representing a yaw rate of the transportation vehicle, a second signal representing a wheel speed of a wheel of the transportation vehicle, a third signal representing a steering angle of the transportation vehicle, and a fourth signal representing a dynamic tire circumference of the wheel of the transportation vehicle;
ascertaining a first output signal of a first Kalman filter that represents the dynamic track width, using the first signal, the second signal, the third signal, and the fourth signal as input signals for the first Kalman filter; and
using the first output signal in a control unit of the transportation vehicle.

19. A device for ascertaining a dynamic track width of a transportation vehicle, the device comprising:
an evaluation unit;
a data input; and
a data output;
wherein the evaluation unit is configured to:
receive, in conjunction with the data input, a first signal representing a yaw rate of the transportation vehicle, a second signal representing a wheel speed of a wheel of the transportation vehicle, a third signal representing a steering angle of the transportation vehicle, and a fourth signal representing a dynamic tire circumference of the wheel of the transportation vehicle;
ascertain a first output signal of a first Kalman filter that represents the dynamic track width, using the first signal, the second signal, the third signal, and the fourth signal, as input signals for the first Kalman filter; and
use, in conjunction with the data output, the first output signal in a control unit of the transportation vehicle.

* * * * *